(12) United States Patent
Guingo et al.

(10) Patent No.: US 8,095,640 B2
(45) Date of Patent: Jan. 10, 2012

(54) DISTRIBUTED ARCHITECTURE FOR REAL-TIME FLOW MEASUREMENT AT THE NETWORK DOMAIN LEVEL

(75) Inventors: Pierrick Guingo, Ottawa (CA); Vincent Mouilleron, Ottawa (CA); Arnold Jansen, Manotick (CA); Gerard Damm, Ottawa (CA)

(73) Assignee: Alcatel Lucent, Paris (FR)

( * ) Notice: Subject to any disclaimer, the term of this patent is extended or adjusted under 35 U.S.C. 154(b) by 2444 days.

(21) Appl. No.: 10/733,393

(22) Filed: Dec. 12, 2003

(65) Prior Publication Data
US 2005/0132044 A1  Jun. 16, 2005

(51) Int. Cl.
*G06F 15/173* (2006.01)
(52) U.S. Cl. ........................ 709/224; 709/238
(58) Field of Classification Search .................. 709/224, 709/238, 235
See application file for complete search history.

(56) References Cited

U.S. PATENT DOCUMENTS
6,751,191 B1 * 6/2004 Kanekar et al. ............... 370/217
2001/0021176 A1   9/2001 Mimura et al.
2002/0145981 A1 * 10/2002 Klinker et al. ............... 370/244

OTHER PUBLICATIONS

Mochida, Y. et al., The Photonic Technologies Impact on the Next Generation Network, Wireless Personal Communications, vol. 17, No. 2/3, Jun. 2001.
Hakata, A. et al., IP Core Transport Network, Fujitsu Science & Tech. Journal, Jun. 2001.
Zseby, T et al., QoS Monitoring and Measurement Benchmarking, NGN Initiative, Oct. 8, 2002.
Hakata, Akira, et al., IP Core Transport Network, Fujitsu Science and Tech. Journal, vol. 37 No. 1, p. 12-21, Jun. 2001.
BrownLee, N., et al., Traffic Flow Measurement: Architecture, The Internet Society, 1999.

* cited by examiner

*Primary Examiner* — Andrew Caldwell
*Assistant Examiner* — Maceeh Anwari
(74) *Attorney, Agent, or Firm* — Kramer & Amado P.C.

(57) ABSTRACT

A virtual router network (VRN) for performing real-time flow measurements (RTFM) is provided. The VRN effectively reduces the number of traffic metering points required thereby simplifying the aggregation and exportation of flow records to a collector. The collector may be service manager in a network management system. The metering points, in a preferred embodiment, are at virtual interfaces (VI) which are edge nodes in VRN. One of the virtual interfaces is selected as a master virtual interface and act as a collector and distributor of flow related information. In one aspect of the invention the VRN is used to provide, non-invasively, per-flow delay monitoring in a communication system.

25 Claims, 8 Drawing Sheets

|  | Source | Destination | Total PDU Nb | Other counters | Averaged delay |
|---|---|---|---|---|---|
| flow record 1 | xxx | xxx | xx | ... |  |
| flow record 2 | xxx | xxx | xx | ... |  |
| flow record 3 | xxx | xxx | xx | ... |  |
| flow record 4 | A | B | 1500 | ... | d |
| flow record 4 | xxx | xxx | xxx | ... |  |

Knowing that no delay computation was possible at time *t1*, then the average delay *d* is computed as follow:

$$d = \frac{[(t0+d0)-t0] + [(t0+(2*i)+d2) - (t0+(2*i))] + \ldots + [(t0+(n*i)+dn) - (t0+(n*i))]}{n-1}$$

Which means:

$$d = \frac{d0 + d2 + \ldots + dn}{n-1}$$

Aggregated flow table with per flow delay computation before export to the service manager

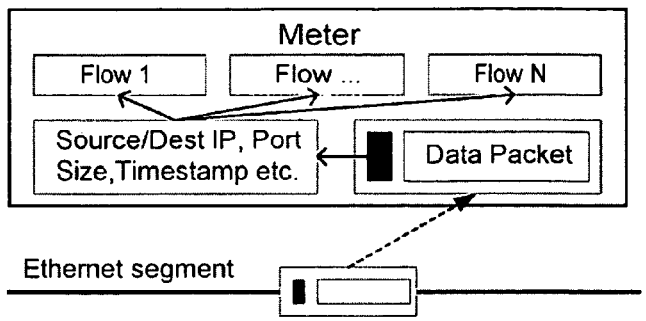
Figure 1 – Real Time Flow Monitoring
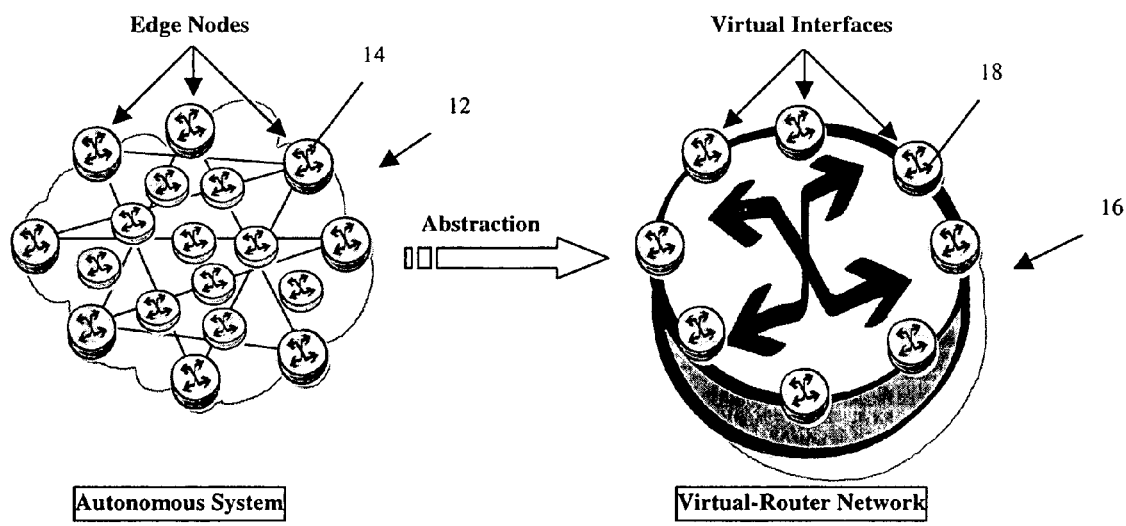
Figure 2 – Virtual-Router Network Paradigm

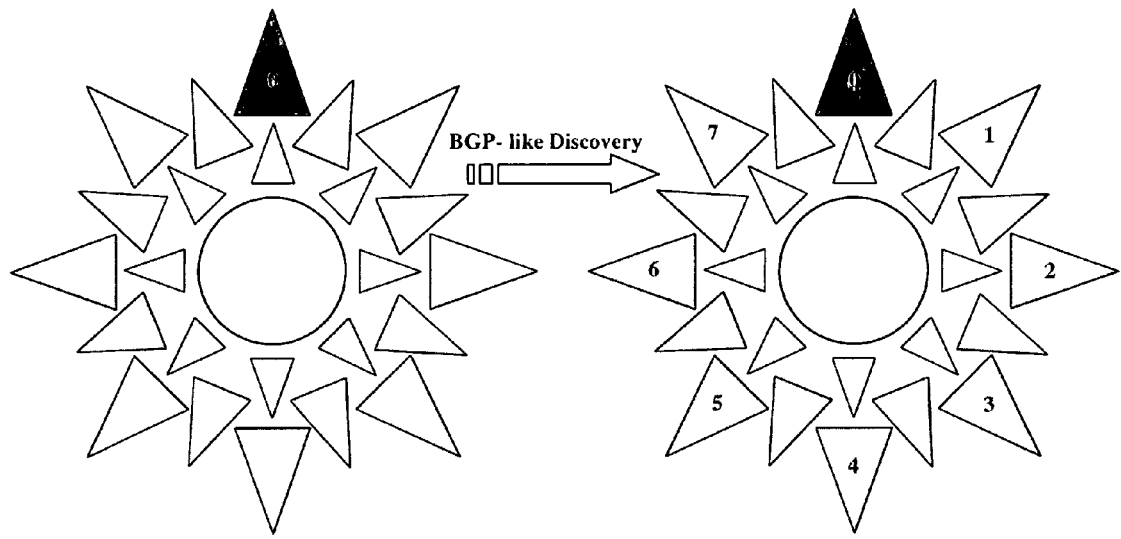
Figure 3 – Metering Points Discovery, initial
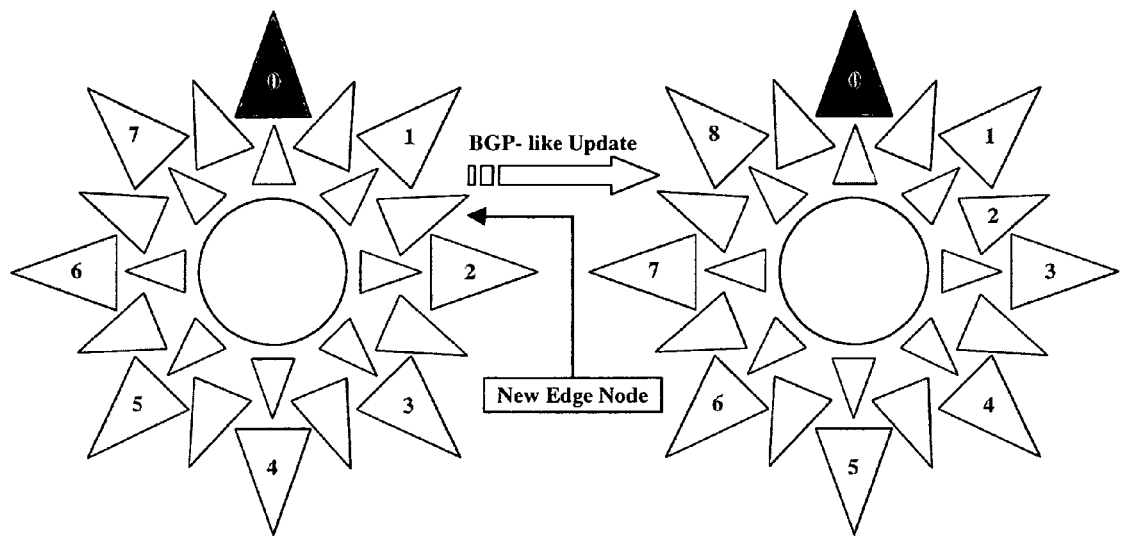
Figure 4 – Metering Points Discovery, addition of an edge node

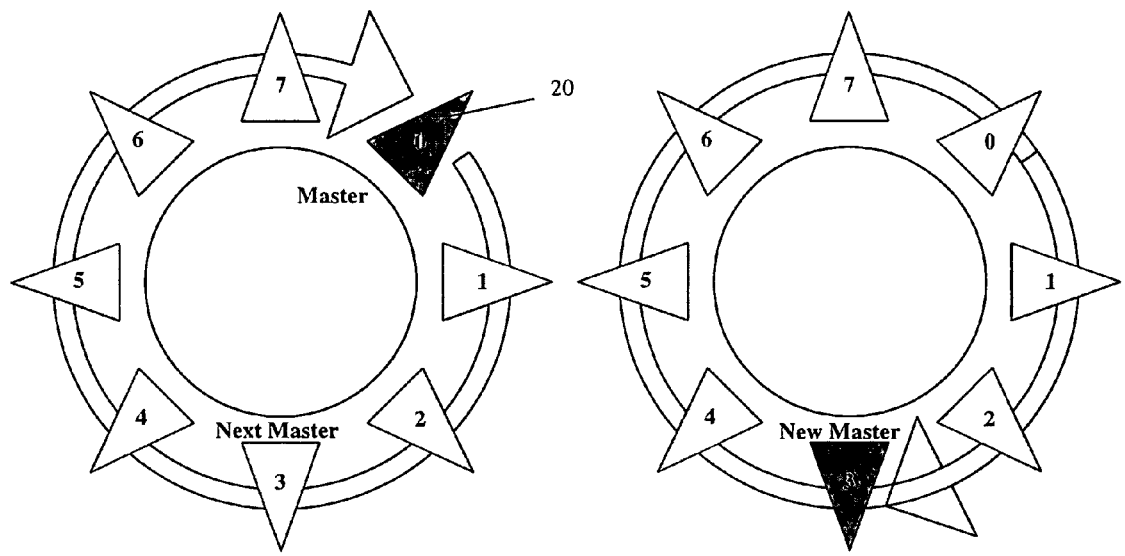
Figure 5 a.  Master Election  Figure 5 b.
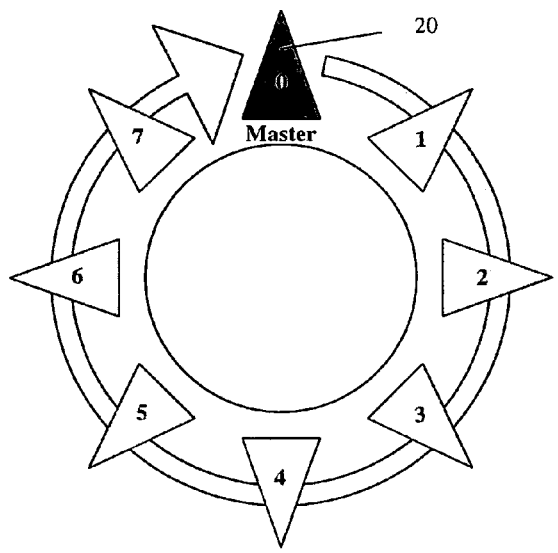
Figure 6 – Flow Monitoring Configuration

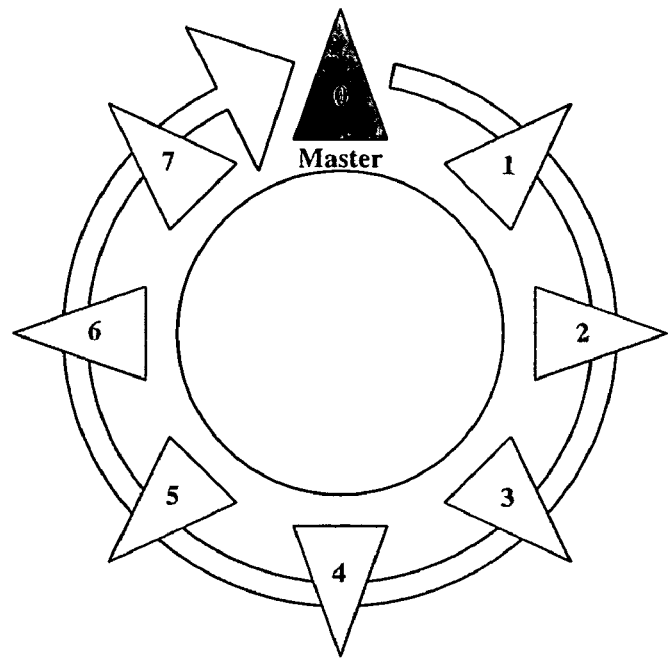
Figure 7 – Flow Aggregation
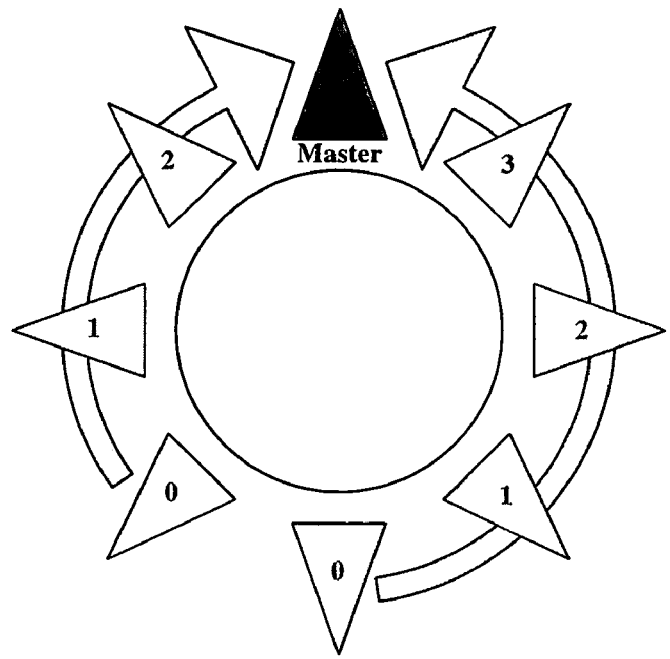
Figure 8 – Optimized Flow Aggregation

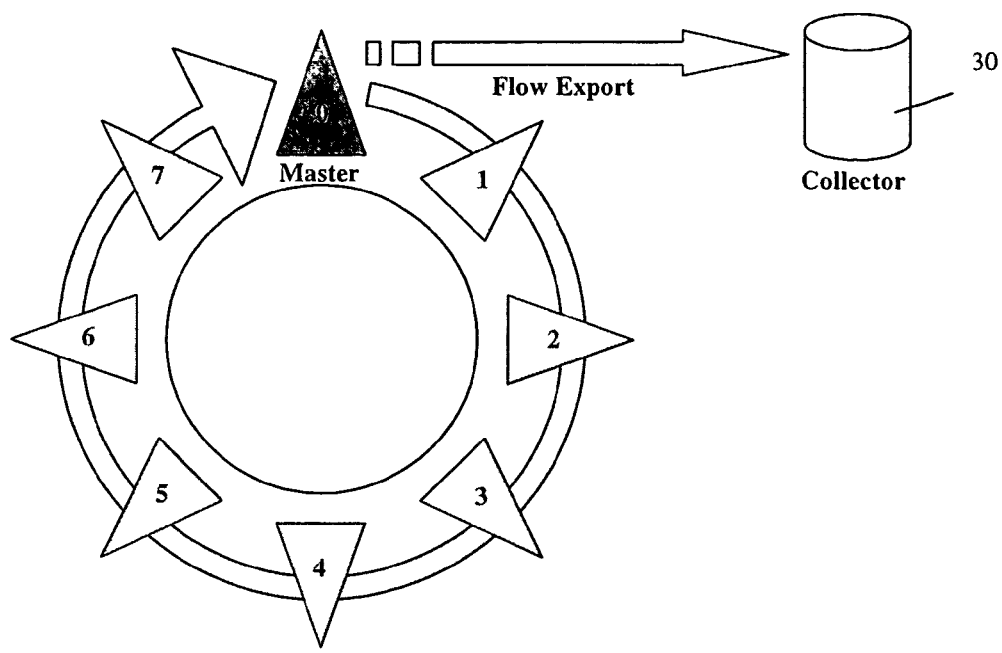
Figure 9 – Flow Collection
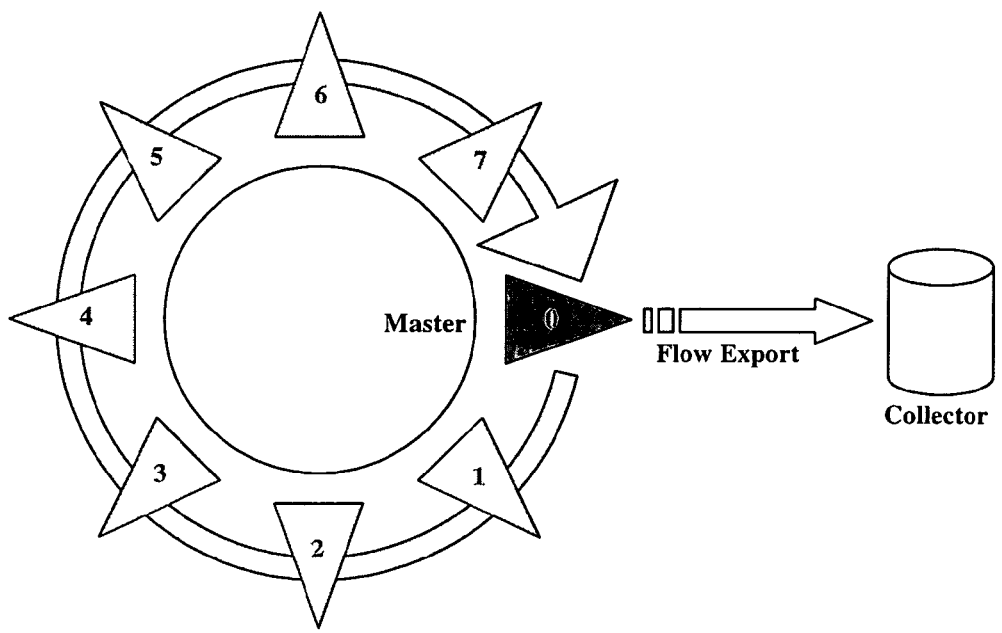
Figure 10 – Master changes, no impact on Flow Collection

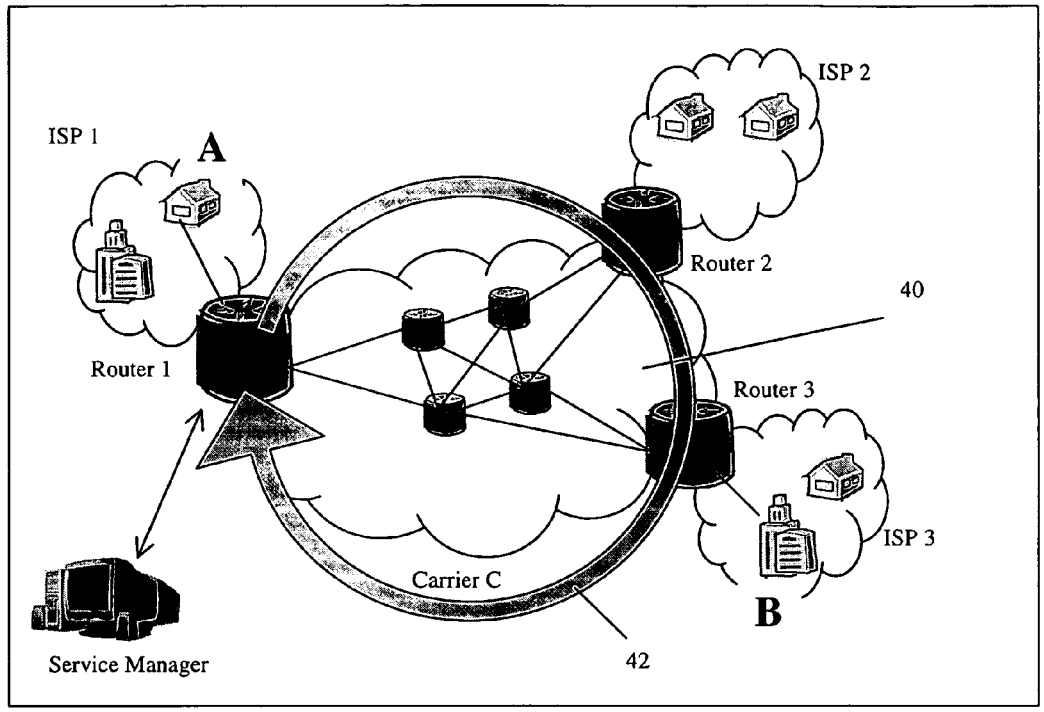
Figure 11: Scope of the invention
|  | Source | Destination | Total PDU Nb | Other counters | Delay[t] <key, timestamp> |
|---|---|---|---|---|---|
| flow record 1 | xxx | xxx | xxx | ... |  |
| flow record 2 | A | B | 1500 | ... | <k0, t0> |
|  |  |  |  |  | <k1, t0+i> |
|  |  |  |  |  | <k2, t0+(2*i)> |
|  |  |  |  |  | ... |
|  |  |  |  |  | <kn, t0+(n*i)> |
| flow record 3 | xxx | xxx | xxx | ... |  |
Figure 12: Flow table at Router1

| | Source | Destination | Total PDU Nb | Other counters | Delay[t] <key, timestamp> |
|---|---|---|---|---|---|
| flow record 1 | xxx | xxx | xx | ... | |
| flow record 2 | xxx | xxx | xx | ... | |
| flow record 3 | A | B | 1500 | ... | <k0, t0+d0> |
| | | | | | <k2, t0+(2*i)+d2> |
| | | | | | ... |
| | | | | | <kn, t0+(n*i)+dn> |
| flow record 4 | xxx | xxx | xxx | ... | |

Figure 13: Flow table at Router3

|  | Source | Destination | Total PDU Nb | Other counters | Averaged delay |
|---|---|---|---|---|---|
| flow record 1 | xxx | xxx | xx | ... | |
| flow record 2 | xxx | xxx | xx | ... | |
| flow record 3 | xxx | xxx | xx | ... | |
| flow record 4 | A | B | 1500 | ... | $d$ |
| flow record 4 | xxx | xxx | xxx | ... | |

Knowing that no delay computation was possible at time $t1$, then the average delay $d$ is computed as follow:

$$d = \frac{[(t0+d0)-t0] + [(t0+(2*i)+d2) - (t0+(2*i))] + \ldots + [(t0+(n*i)+dn) - (t0+(n*i))]}{n-1}$$

Which means:

$$d = \frac{d0 + d2 + \ldots + dn}{n-1}$$

Figure 14: Aggregated flow table with per flow delay computation before export to the service manager

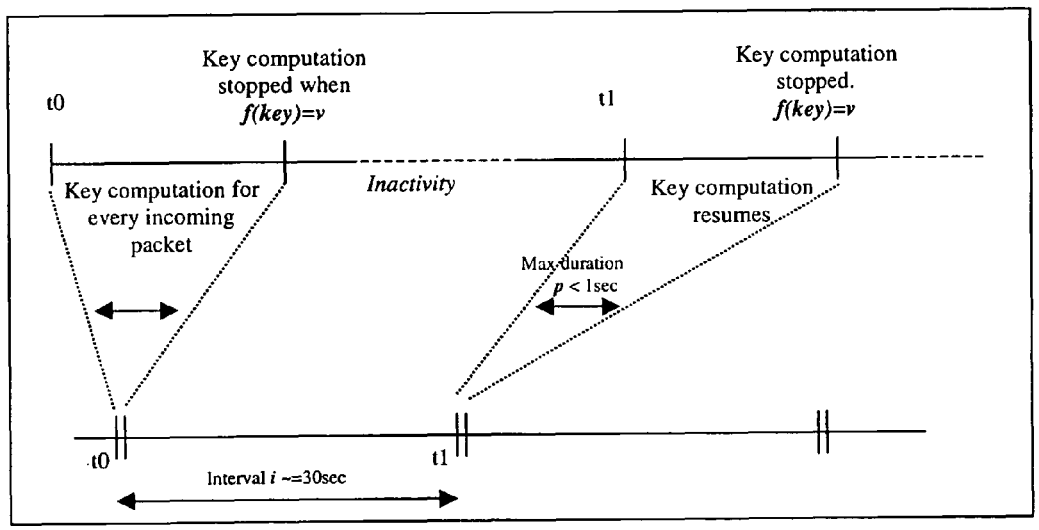

Figure 15: Load over time for the routers

DISTRIBUTED ARCHITECTURE FOR REAL-TIME FLOW MEASUREMENT AT THE NETWORK DOMAIN LEVEL

FIELD OF THE INVENTION

This invention relates to computer-based communication systems and more particularly to systems and methods for non-invasive flow measurements in such communications systems.

BACKGROUND OF THE INVENTION

Due to the continuous growth of Internet traffic, methods of performing real-time, non-invasive flow measurements are becoming more and more important for operators to monitor network performance, detect router availability, troubleshoot network congestion, and measure QoS without introducing additional traffic. This is especially true for service providers who have to guarantee the Service Level Agreements (SLAs) to their customers.

Today, there are several solutions or mechanisms both active and passive, to tackle the underlying problem. Some of these solutions are set out below.

In today's networks, switches/routers individually store and collect a set of traffic statistics into their built-in Management Information Base (MIB) thus providing a view of the traffic performance limited to a node with no comprehensive view of the traffic behavior at the network level. A network or element manager can retrieve these traffic statistics by using the SNMP management interface of the routers. Typical traffic statistics could be the number of discarded packets, error packets, port utilization, buffer utilization, etc. These statistics are collected for later analysis. When a network congestion or event occurs, the SNMP agent embedded in the IP router will send a trap message to the SNMP manager, which then indicates an alarm in its graphical user interface.

The network management system for IP routers usually involves the SNMP manager and SNMP agent, which use the SNMP MIB for storing control information and performance statistics. However, the MIB is embedded in the IP router and corresponds to the structure and implementation of the underlying hardware. Once the design is completed, changing the MIB to accommodate new traffic performance parameters of interest is not easy.

The router MIB is designed based on the specific structure and implementation of the IP router, and therefore will not be the same for equipment from different vendors. For example, the Argent Guardian tool from Argent Software Inc. has different versions for performance monitoring, proactive problem detection and correction depending on the monitored entities. The Argent Guardian for Cisco can only be used for Cisco routers because it uses the Cisco router MIB to retrieve and query the traffic information.

Active performance monitoring mechanisms send special test-packets to the underlying networks or routers, and analyze the response. Currently, most tools for monitoring QoS in IP networks are based on the traditional "ping" (i.e., ICMP and echo response messages) to measure the roundtrip delay between two hosts. Variations of ping include "Nikhef ping" and "fping". Several other tools are based on the traditional "traceroute" such as "Nikhef traceroute" and "network probe daemon".

The PingER project at SLAC (Stanford Linear Accelerator Center) uses repeated pings between ESnet (Energy Sciences Network) sites. The AMP (Active Measurement Program) project by NLANR (National Laboratory for Applied Network Research) performs pings and traceroutes between NSF-approved high-performance connection sites. The NIMI (National Internet Measurement Infrastructure) project measures the performance between sites using traceroute or TCP bulk transfer.

The typical passive traffic analysis is performed in a non-invasive way with respect to the observed networking environment. It will not introduce any additional traffic and therefore will not affect the performance of the network while doing measurements. The traditional approach usually includes:

collection of TCP/IP packets (e.g. traffic sniffers, etc.) or the packet header data, hardware and software for analyzing the collected databases and finally, off-line traffic characterization and modeling.

The National Laboratory for Applied Network Research (NLANR) has been using the OCXmon monitors to tap into the light of a fiber interconnection by means of optical splitters, and collect packet header traces. Traffic data was collected in an abstract format by extracting and storing the packet header in the database within a preset traffic aggregation period. It is followed by an off-line traffic analysis. System vendors all have proprietary solutions to collect statistics more at the flow level. Cisco offers a NetFlow capability in its large routers. NetFlow is able to identify traffic flows based on IP source/destination addresses, protocol ID field, type of service (TOS) field, and router port. Statistics can be collected for a traffic flow, and exported to a collector when the flow expires. Flow statistics may include the flow start/stop times, number of bytes/packets, and all IP header fields.

An IETF proposal (RTFM, RFC 2722) also targets the provisioning of flow monitoring capability, even if not yet present in any industry product. Chip vendors often propose statistic built-in solutions (especially TCAM vendors, with a number of entry hits for instance). Lucent Bell Labs has various research projects in traffic analysis, which focus mainly on collection of TCP/UDP/IP packet header data, off-line traffic analysis, modeling and visualization.

Thanks to the traditional passive analysis mechanisms, many traffic studies have attempted to understand the random behavior or composition of Internet traffic. However, they all focus on off-line analysis of historical data. There are no prominent research projects attempting traffic analysis and control, based on real-time traffic measurement or comprehensive traffic profiling. For example, Lucent's projects reflect the traditional approach of collecting large traffic measurement data sets and off-line statistical analysis. Cisco Net-Flow essentially measures the volume and duration of each traffic flow for accounting purpose and off-line traffic analysis. But NetFlow is not intended to be used for real-time network monitoring and querying. The OCXmon tool from NLANR is only for IP over ATM traffic, and is not for traffic monitoring and control purpose. Moreover, each OCXmon monitor captures just the first ATM cell from each IP packet thus providing incomplete IP trace.

But all of the above solutions are node centric, and none really adopts a network view to addresses the problem, even if a need is indirectly acknowledged throughout the interest shown and efforts spent on flow aggregation features by all interested parties.

The present invention relates to two aspects namely aggregation and correlation of packet filtering information. The aggregation task will be described first while the correlation task is described later. The invention allows distributing these tasks among all the edge routers of the network thus avoiding off line analysis by the service manager to compile their results and thus optimizing the processing of these tasks. The delay computation is presented herein as an example of a possible correlation. It will be apparent to one skilled in the art that the correlation aspect can be applied to other applications. Furthermore, the invention is not limited to IP networks but could be applied to any communication network.

The basic idea of this invention is to combine the advantages of two technologies, Real-Time Flow Management (RTFM) and virtual router network, to provide a flow monitoring concept at the network level, offering characterization of through-traffic in a passive way.

Today, IP routers and switches collect limited traffic statistics for network performance over time intervals. Recognizing the need for more timely and sophisticated traffic measurements, the IETF RTFM (RFC 2722) working group developed a general framework for measuring properties of traffic flows in real-time. After defining a traffic flow as a portion of traffic, delimited by a starting and ending time, IETF RFC 2722 identifies flows in terms of their attribute values such as source/destination addresses, cumulative count of bytes and packets, service type, packet size, flow state information, QoS parameters. The general framework for real-time flow monitoring is shown in FIG. 1.

The RTFM architecture includes two main functional components: the traffic meter and the meter reader. The traffic meter follows a "rule-set" (packet filter) to identify the flow of packets to monitor. A packet-matching engine performs the packet classification to identify the flow to which a packet belongs according to the rules defined. The traffic meter measures specific attributes of the identified traffic flows, and records the measurements in a flow table. The meter reader will query the contents of the flow table for data analysis. The following are the benefits of using the RTFM architecture:

All data on the network is recordable—all data transmitted over a network can be tracked, recorded, and aggregated without affecting the data flow (assuming necessary implementation steps have been taken to respect node performance constraints that eventually relate to limited execution clock cycles).

Independence from physical and data layer technologies (i.e. analog phone line, fiber-optic) used to transmit the data between source and destination—these details are not required in the measurement of network flows. Flow monitoring gives a logical view of the network more suitable for QoS management than the physical view.

Good performance even during fault conditions—Flow meters are far less vulnerable than other parts of the network infrastructure since they passively intercept the data packets, thus maintaining accurate bandwidth consumption statistics where other parts of the network fail. Flow metering can be used even if the given network elements are incapable of flow monitoring.

Flows have a meaningful granularity—Flexible, comprehensive and scalable aggregation strategies can easily be provisioned.

The approach contemplated by the invention is to make the core network operate and appear like a single router. This concept is discussed in a publication by Hakata et al. entitled "IP Core Transport Network", Fujitsu Sci. Tech. J., 37 pp 12-21 (June 2001). Most of the intelligence is moved to the edge node, and the core consists of a simple, very high capacity data transport mechanism. Incoming IP packets are processed at the ingress node and sent to paths assigned between the ingress and egress nodes.

The internal transfer of IP packets in the virtual-router network is done based on a switching technology (layer 2 label switching: MPLS) which is less time consuming than conventional routing algorithm. This architecture relieves the IP data from the hop-by-hop processing required for the current router networks that execute IP layer processing in each core router/node. Basically, nodes except edge nodes do not need to perform IP layer processing and just need to handle layer 2 label switching (MPLS).

The best-effort path and QoS class paths are prepared at the edge node where each IP packet is properly assigned to the appropriate path. The QoS class path is provided by using the DiffServ capability of MPLS. This means that different QoS class paths can be realized without the need of too much packet processing power at the core node.

The interfaces (edge nodes) of the virtual-router network search for the optimal routes automatically, set explicit paths, and balance loads by splitting the IP flows into multiple paths. In this way, the virtual-router ensures a high utilization of the core network resources and improves the service quality by avoiding congestion.

One practical implementation of the aggregation and correlation aspects of the invention allows performing performance measurement on a per flow basis. When providers offer a service, they are tied to their customers by contracts that guarantee the quality of the services paid for. One of the characteristics of the traffic used to qualify the agreement is the delay, i.e. the end-to-end delivery time of packets. One of the usual terms of an SLA is that a customer agrees to pay a certain price for a connection service, but only if the traffic delay is less than a certain threshold. If the delay becomes longer, then the provider did not respect the contract which implies financial penalties. So obtaining reliable performance information on sensitive traffic for customers is of utmost importance for all parties to justify the commercial value of the service provided.

The importance of providing per customer traffic information has led to the development of per flow monitoring technologies, the most popular implementation being the aforementioned Netflow from Cisco.

However, none of the existing flow monitoring solutions gives a solution to perform per flow traffic performance measurement.

The best tools available to compute performance apply active measurement techniques based on PING wherein ICMP packets are sent from one point to another. These packets provide sequence numbering and timing information based on which packet loss and delay are computed. Evolutions have been brought to perform PING on specific quality of services (matching the CoS of customer traffic).

Data on customer usage of service can be provided by flow monitoring solution, and service performance can be computed by PING like tools. But nothing exists to correlate the information received from a PING to a specific customer flow. PING gives status on a link between two end points at a specific point in time, but do NOT provide the accurate performance experienced by a specific customer flow.

Furthermore a PING is an active measurement method. It works by introducing new traffic to the existing traffic. It thus impacts the overall traffic performance and still does not characterize real traffic.

Other intrusive solutions have been foreseen. For instance, by encapsulating the customer traffic in specific packet format with special processing at the egress side, or by tagging a packet. But these solutions are not yet satisfactory as customer packets are "touched".

SUMMARY OF THE INVENTION

The present solution is a passive, non-intrusive measurement method and uses the notion of flow to obtain performance measurement results for specific user traffic.

In accordance with a first aspect of the present invention there is provided a method of monitoring traffic flows in a domain of a communications network, the domain being logically arranged as a virtual router network having virtual interfaces at edge nodes of the domain, comprising the steps of: a) determining, at a virtual interface and in dependence upon a rule set, whether a packet belongs to a flow to be monitored; b) accounting, responsive to the packet belonging to a flow to be monitored, the packet in a flow record corresponding to that flow; and c) aggregating the flow records for transmission to a collector. As a result of the aggregated flow records, a service manager is able to derive records from the collector and provide a synthesized view of the network as to how well the service is performing without the need for off-line analysis.

In accordance with a second aspect of the present invention there is provided a system for monitoring traffic flows in a domain of a communications network, the domain being logically arranged as a virtual router network having virtual interfaces at edge nodes of the domain, the system comprising: means at a virtual interface for determining in dependence upon a rule set, whether a packet belongs to a flow to be monitored; means for accounting, responsive to the packet belonging to a flow to be monitored, the packet in a flow record corresponding to that flow; and means for aggregating the flow records for transmission to a collector.

In accordance with a third aspect of the present invention there is provided a method of measuring per-flow traffic delay between two routers having synchronized clocks, comprising the steps of: a) calculating, at each of the routers, for a given time interval, a key for packets in the flow, wherein the key uniquely and invariantly identifies a corresponding packet in the flow; b) selecting, at each of the routers using the key, a packet to be monitored; c) recording, at each of the routers, a timestamp upon selection of each packet; and d) subtracting the timestamps to determine the delay for the packet.

In accordance with a further aspect of the present invention there is provided a system for measuring per-flow traffic delay between two routers having synchronized clocks, comprising: means for calculating, at each of the routers, a key for every packet in the flow, wherein the key uniquely and invariantly identifies a corresponding packet in the flow; means for selecting, at each of the routers using the key, a packet to be monitored; means for recording, at each of the routers, a timestamp upon selection of each packet; and means for subtracting the timestamps to determine the delay for the packet.

BRIEF DESCRIPTION OF THE DRAWINGS

The invention will now be described in greater detail with reference to the attached drawings wherein:

FIG. 1 illustrates a basic real time flow monitoring system;

FIG. 2 illustrates the concept of a virtual router network paradigm according to the invention;

FIG. 3 illustrates an initial metering points discovery concept;

FIG. 4 illustrates the addition of an edge node in the metering point discovery concept of FIG. 3;

FIGS. 5a and 5b illustrate the election of a virtual interface as a master;

FIG. 6 shows the path flow of configuring the metering points;

FIG. 7 shows an example of the path flow of aggregating data;

FIG. 8 shows an example of the optimized flow aggregation concept;

FIG. 9 illustrates the collection of flow data;

FIG. 10 shows that there is no impact on flow collection when the master changes;

FIG. 11 is a high level drawing of a particular implementation of the present invention;

FIG. 12 illustrates an example of flow table containing information at router 1 of FIG. 11 for delay computation;

FIG. 13 illustrates an example of flow table containing information at router 3 of FIG. 11 for delay computation;

FIG. 14 shows the aggregation of the flow tables of FIGS. 12 and 13 for delay computation; and FIG. 15 illustrates an example of load over time for the routers for delay computation.

DETAILED DESCRIPTION OF THE INVENTION

The virtual router paradigm of the present invention as shown in FIG. 2 allows for masking the internal behavior of a network domain. A network, a sub-network, an autonomous system (12), any kind of cluster of nodes 14, can be seen as a black box, self-maintained, inside of which necessary network management tasks are automatically performed. But only its interactions with its surrounding environment are of concern when looking at the added value of the network. Hence the importance given to SLA checking or inter-domain (e.g. AS to AS) statistics gathering. By applying the concept of real-time flow measurement to an abstraction such as virtual router network 16, the service management plane can directly offer to network operators meaningful statistics on their services, versus actual records from various nodes to be aggregated at the management level. The invention offers a synthesized view of the network answering customer concerns about how well a service performs, more than how the network works.

Achieving such a task implies the need to communicate with the virtual router network (VRN) to specify its flow monitoring behavior, defined by monitoring rules (or policies). Then the VRN must perform monitoring on its interfaces according to the specified rules, and send flow records. This is a perfect match for the RTFM architecture, where VRN would be a meter reader and where VRN virtual interfaces would implement the RTFM meters, but also maps any other flow monitoring architecture as they all use the concepts of metering point, aggregation and export.

The RTFM manager (part of the Service Manager) (not shown) sends its rule set to the VRN by targeting one of its Virtual Interfaces (VI) 18. Upon reception of the rule set by the Virtual Interface, a selection process as shown in FIG. 3 is triggered to define the most suitable Virtual Interface to host the function of VRN performance monitoring interface (also called "master") with the service manager. This selection process is made upon criteria such as CPU usage, traffic to handle, memory capacity. Candidates are all Virtual Interfaces. They are known to each other thanks to a protocol such as BGP (Border Gateway Protocol) (FIG. 4). Relying on such a technology allows for total independence to topology changes. Virtual interfaces can be added, removed, without requiring any specific action to be taken at the VRN flow monitoring level. To implement the master election process as shown in FIG. 5a, a list of candidate Virtual Interfaces is established and passed from one Virtual Interface to another. At each hop, the Virtual Interface checks if it has more appropriate capabilities than the previous best candidate virtual interface. If yes, it marks itself as the best candidate to host master functionality. Then the Virtual Interface just passes the list to the next candidate virtual interface and so on. The list is propagated until the best candidate Virtual Interface receives it again with itself as best candidate. At that time it knows it is the best candidate among all to act as the master. Notice that, this election process can be renewed based on capability changes, upon expired timeout, or changes in topology (FIG. 5b) as a more suitable virtual interface could be added.

Once elected, the master 20 is first in charge of propagating the flow monitoring rules to all Virtual Interfaces (FIG. 6). This is simply done by advertising it to every virtual interfaces according to the list previously used to elect the master. Once triggered on every virtual interface, the VRN performs aggregation of flow records (FIG. 7) before sending records to the service management. A possible implementation of the aggregation process follows the same circular path than for the election process. The master sends its flow table to the next virtual interface in the list. Upon reception, the next Virtual Interface updates record value of already existing flow entries and adds its new entries to reflect what it monitored. The new flow table is then passed to the next Virtual Interface in the list until it comes back to the master. At that time, the master has a perfect aggregated view of what happened in the network for all monitored flows.

A ring-propagation scheme allows distributing the aggregation task to all the nodes and would be preferably used as it is more efficient than existing mechanisms where all the nodes transfer their flow table to the master for aggregation. A more optimized process could be considered, for example by parallelizing the tasks as shown in FIG. 8.

The export of the records as shown in FIG. 9 is then done following a push or pull model, meaning that the master sends its information to a flow collector 30 (possibly part of the service manager). A push model allows masking the change of the VRN master to the collector (see FIG. 10).

The idea of applying RTFM to virtual router networks has to Applicant's knowledge, never been seen before. Compared to a pure RTFM solution, the advantage is that the service monitoring manager does not need to know every node present in the VRN, it does not need to configure all of them and most important it does not need to retrieve flow records from all of them to later on aggregate them. It deals with one entity (the VRN), which provides it with aggregated records.

In addition the service manager only sees what it is concerned with. Real-time issues requiring intensive exports stay internal to the Virtual Interfaces and are not known by the service manager. All of this saves export bandwidth, one of the major problems encountered by any actual flow monitoring solution.

The solution is topology independent since it is based on BGP protocol (or equivalent) to maintain the knowledge of Virtual Interfaces. Configuration and updates are transparent.

The behavior of every virtual interface is uniform. Each virtual interface supports the same functionality and can be automatically assigned the role of master to propagate rules, perform aggregation and export measurement data. This simplifies the deployment of the edge nodes by avoiding the need to install a specific one for each task.

The invention facilitates the deployment of large scaled flow monitoring systems by embedding them in the network elements and automating their configuration, while narrowing the transfer of measurement data to the service manager applications automatically to the required information, hence avoiding the need for further processing.

In accordance with another embodiment of the invention the virtual network router performs performance computation in a passive, non-intrusive way (i.e. the method is not adding measurement traffic to the data path nor does it modify the content of the measured user traffic).

By using the flow monitoring technology previously described only the relevant performance parameters pertaining to specific flows of user traffic are computed and correlated. This method results in a lower bandwidth usage to export measurement data than used in existing flow monitoring solutions.

The variation of any parameter of a flow between two measurement points can efficiently be processed and correlated at the edges of a network. Also, the process of correlating measurement data is fully distributed, thereby off-loading correlation tasks from centralized management systems.

The flow parameters for which it is important to observe the variation between ingress—and egress measurement points are: arrival time (to calculate delay, delay variation), number of bits per second (bit rate variation, burstiness), and the number of packets (packet loss). These parameters characterize the end-to-end performance (ingress to egress) induced by the network.

FIG. 11 gives a framework to illustrate the invention. Let's assume that customer A wants to reach B. To do so, traffic needs to pass through the backbone 40 owned by the carrier C, while internet connectivity service is provided by ISP1 and ISP3. ISP1, 2 and 3 signed an agreement with the carrier defining the maximum delay authorized for their traffic (this is part of the SLA). This delay can be specified per type of flow. For instance a higher delay can be accepted on Email traffic versus VoIP.

The first point to notice is that ISP1, 2 and 3 do not care about how the traffic is flowing inside the network of the carrier. Their interest is to have a summarized view of the end to end traffic performance provided by the carrier C from edge to edge. At the same time, one objective is to send as little data as possible to the service management in order to reduce bandwidth utilization and resources on the nodes. These two aspects justify the re-use of the framework previously defined and are materialized on FIG. 11 by the ring 42 grouping every edge node supporting this framework.

One of the edge routers is elected master. Once elected, the master, indicates to the other edge nodes which flows to monitor and to which adjacent edge node they will have to send their flow table for correlation. When time for aggregation and correlation of measurement data comes, the master sends its flow table to the next edge router specified in the aggregation list (materialized by the circular arrow in FIG. 11). Upon reception, the next edge router updates/correlates parameters of already existing flow entries and adds its new entries to reflect what it monitored. The new flow table is then passed to the next edge router in the list until it comes back to the master. At that time, the master has a complete, aggregated and correlated view of what happened in the network for all monitored flows.

A ring-propagation scheme of FIG. 11 allows distributing the aggregation and correlation tasks to all the edge nodes and would be preferably used, as it is more efficient than existing mechanisms where all the nodes transfer their flow table to a centralized collector.

It is assumed that all edge routers have accurate clock synchronization mechanisms. The accuracy must be such that the clock imprecision is negligible at the scale of to the measurements done. Delays are computed in order of milliseconds. By comparison, a GPS based clock provides accuracy at the level of the micro-second. So the technology exists today to support this assumption. In the rest of the document, a given time ti refers to a same time reference shared by all nodes in the system.

Starting at time t0, delay computation mechanism is triggered for data flowing between nodes A and B as shown in FIG. 15.

In router1, a key computation is performed for every packet observed during a given time interval for flow A->B until a function f( ), applied to each packet key, returns a specific value v.

The key is built to identify the same packet at both ingress and egress nodes of a network domain inside a flow. This key should be built on invariant header fields of the packet. For instance it should not take into account the TTL field, as the same packet would have two different keys on two different nodes. On the other hand, in the case of a TCP flow, the sequence number is a good candidate for integration in the key computation as a packet always keeps the same sequence number along its path and as the sequence number identifies it uniquely among other packets of the same flow.

f( ) and v are used to select the packets on which delay computation is performed. For instance f( ) could be a modulo function. A packet could be selected for delay computation according to the criteria: mod(key, 1000)=v. As the way to compute the packet key, f( ) and v are common on both ingress and egress node, the packet on which to get timing information will be identified on both side.

So for a specific packet verifying f(key)=v on router1, an entry called "delay" is added in the list of fields of the flow record handled by the flow monitoring mechanism (i.e. RTFM). This entry contains the key that was computed and a time stamp. The data structure for the flow record corresponding to the time the packet was observed is shown in FIG. 12.

In router3, the same key computation is performed on every incoming packet belonging to flow A->B during the same time interval. It lasts until a f(key)=v is found, f and v being the same as that on router1. If no value v is found after a reasonable period of time p (i.e. TCP retransmit timeout for instance) as shown in FIG. 15, it might mean the packet was lost and no accurate delay computation will be done at time t0. The key computation is stopped as soon as one of the above conditions is fulfilled to reduce data path resource consumption.

Key computation will resume on both ingress/egress router at time t1, for the short duration needed to find the first packet seen after t1 insuring that f(packet key)=v and the same principle applies again and again as shown in FIG. 15.

The interval of time between tn and tn+1 is configurable. This interval is set up by the operator according to the desired accuracy and with regards to usual sampling theory or average computation that applied to the data path. A short interval definition implies more samples, thus better accuracy. But is also implies more data to handle and thus more data path resource consumption. Fortunately delay computation is not a permanent on the fly computation. It can be done for instance every 30 seconds or minute (i.e. interval i between tn and tn+1) and averaged every 5 or 10 minutes period when flow records are aggregated before export as shown in FIG. 15.

FIG. 13 gives an example of information gathered by router3, assuming no delay computation was done at time t1, and FIG. 14 shows how data from FIG. 12 and FIG. 13 are collected and aggregated in a flow record to provide an averaged delay computation to the service manager.

FIG. 15 represents how the work load on a router is distributed over time by this invention. It assumes an interval i of 30 seconds between delay measurements. However requirement for delay measurement would easily be satisfied with one measurement per minute and even more on longer lasting flows. This interval is anyway fully customizable on a per flow basis.

The algorithms needed to implement the invention are set out below:

```
Starting at time t, the system clock should periodically (every i seconds) set the variable
active_delay_computation to true.
At time ti+p, it should set it back to false.
At the data path level, to populate the flow record with delay information:
for each incoming packet {
    if packet belongs to a flow to monitor {       // regular packet classification
        flow_record.update(packet);                // regular monitoring task
        if active_delay_computation == true {
            key = compute_key(packet)
            if f(key) == v then {
                flow_record.add(<key, timestamp>)
                active_delay_computation = false
            }
        }
    }
}
At data aggregation time, at the control plane level of a virtual interface (i.e. router):
for each flow in my flow table {
    if flow does not exist in received_flow_table then
        add it.
    else {
        received_flow_record = flow_record in received table for this same flow
        for each field in my_flow_record
            correlate values between received_flow_record and my_flow_record.
            in case of delay computation:
                for each entry delay[t] in my_flow_record {
                    find among the non computed entries in received_flow_record the
                        entry delay[t] for which its key equals my_flow_record.delay[t].key
                    if such an entry exists then {
                        compute delay for this specific entry
                            abs(my_flow_record.delay[t].timestamp − received_flow_record.delay[t].timestamp)
                        mark this entry has "computed" }
                    else {
                        add the my_flow_record.delay[t] entry in the list of delay[t] entries
                            of received_flow_record. // It will then be passed to the next virtual interface
```

-continued

```
            (i.e. router) for similar correlation processing
            mark this entry as "non computed"
          }
        }
      }
    }
  }
}
Processing required for delay computation by the so-called master at the control plane level:
Perform correlation as described above
Then for each flow with delay computation {
  average_delay = 0;
  n = 0;
  for each delay[t] entries marked as "computed"
    average delay = average_delay+delay
    n++
  }
  average_delay = average_delay / n
  replace in the flow record all delay[t] entries by the single field: average_delay
}
export new flow record table to the service manager.
```

Although particular embodiments of the invention have been described and illustrated it will be apparent to one skilled in the art that numerous changes can be made without departing from the basic concepts. It is to be understood, however, that such changes will fall within the full scope of the invention as defined in the appended claims.

We claim:

1. A method of monitoring traffic flows in a service provider domain of a communications network, the domain being logically configured as a virtual router network having virtual interfaces at edge nodes of the virtual router network, comprising the steps of:
   a) configuring said virtual interfaces with a respective real-time flow measurement meter, said respective real-time flow measurement meter having a uniform behavior with respect to a real-time flow measurement,
   b) determining at said virtual interfaces and in dependence upon a flow monitoring rule set consistent for all of said virtual interfaces, whether a packet belongs to a flow to be monitored;
   c) accounting, responsive to the packet belonging to a flow to be monitored, the packet in a flow record corresponding to that flow maintained by said respective real-time flow measurement meter; and
   d) aggregating the flow records from all virtual interfaces at a master virtual interface for transmission to a collector for enabling said service provider to identify if a specified flow record abides to terms of a corresponding service level agreement pertaining to said specified flow record.

2. The method as defined in claim 1, further comprising an initial step of selecting one of the virtual interfaces as the master virtual interface.

3. The method as defined in claim 2 wherein the step of selecting the master virtual interface is done by polling each of the virtual interfaces to determine which one best satisfies a selection criteria.

4. The method as defined in claim 3 wherein the selection criteria includes CPU usage, traffic handling capability and memory capacity.

5. The method as defined in claim 2, further comprising following the selecting step, initiating, by the master virtual interface, distribution of the rule set to the other virtual interfaces.

6. The method as defined in claim 2 comprising following the selection step, by the master virtual interfaces, collecting aggregated flow records from the other virtual interfaces.

7. The method as defined in claim 6, wherein the aggregated flow records are sent to the collector by the master virtual interface.

8. The method as defined in claim 6 wherein collecting aggregated flow records is performed serially.

9. The method as defined in claim 6 wherein collecting aggregated flow records is performed in parallel.

10. The method as defined in claim 6 wherein the aggregated flow records are provided to the collector using either a push or a pull collector operation.

11. The method as defined in claim 5 wherein a service manager initiates the triggering selection process by sending a new or updated rule set to the master.

12. The method as defined in claim 11 wherein the service manager receives aggregated flow records from the collector.

13. A system for monitoring traffic flows in a service provider domain of a communications network, the domain being logically configured as a virtual router network having virtual interfaces at edge nodes of the virtual router network, the system comprising:
   means for configuring said virtual interfaces with a respective real-time flow measurement meter, said respective real-time flow measurement meter having a uniform behavior with respect to a real-time flow measurement;
   means at said virtual interface for determining in dependence upon a flow monitoring rule set consistent for all of said virtual interfaces, whether a packet belongs to a flow to be monitored;
   means for accounting, responsive to the packet belonging to a flow to be monitored, the packet in a flow record corresponding to that flow maintained by said respective real-timeflow measurement meter; and
   means for aggregating the flow records from all virtual interfaces at a master virtual interface for transmission to a collector.

14. The system as defined in claim 13 wherein one of said virtual interfaces is selected as the master virtual interface.

15. The system as defined in claim 14 wherein the master virtual interface has means to distribute rule sets to other virtual interfaces.

16. The system as defined in claim 15 wherein the master virtual interface has means to collect aggregated flow records from the other virtual interfaces and to report the aggregated flow records to a collector.

17. The system as defined in claim 16 having a service manager to initiate a selection of the master virtual interface and to collect aggregated flow records from the collector.

18. A method of measuring per-flow traffic delay between two routers having synchronized clocks, comprising the steps of:
   a) calculating, at each of the routers, a key uniquely and invariantly identifying a corresponding packet in the flow;
   b) selecting, at each of the routers using the key, a packet to be monitored;
   c) recording, at each of the routers, a timestamp upon selection of each packet; and
   d) subtracting the timestamps to determine the delay for the packet.

19. The method as defined in claim 18 wherein multiple packets are monitored and an average delay for the multiple packets is calculated.

20. The method as defined in claim 19 wherein if a key cannot be calculated within a given time interval indicating lost packets the calculating step is stopped.

21. A computer-implemented system for measuring per-flow traffic delay between two routers having synchronized clocks, comprising:
   means for calculating, at each of the routers, a key for every packet in the flow, wherein the key uniquely and invariantly identifies a corresponding packet in the flow;
   means for selecting, at each of the routers using the key, a packet to be monitored; means . for recording, at each of the routers, a timestamp upon selection of each packet; and
   means for subtracting the timestamps to determine the delay for the packet.

22. The system as defined in claim 21 wherein the routers are edge routers in a virtual router network.

23. The system as defined in claim 22 wherein one of said edge routers is selected as a master edge router and packet filtering information is aggregated and correlated at said master edge router.

24. The system as defined in claim 22 wherein one of said edge routers is selected as a master edge router and the aggregation and correlation processes of packet filtering information are distributed among the edge routers, the results being sent and compiled at said master edge router.

25. The system as defined in claim 23 having a service manager to receive said packet filtering information.

\* \* \* \* \*